April 17, 1934.  G. H. PICKERING  1,955,561

ELECTROMECHANICAL BRAKE

Filed Dec. 9, 1931

Inventor
George H. Pickering
By Frank Hubbard
Attorney

Patented Apr. 17, 1934

1,955,561

UNITED STATES PATENT OFFICE 1,955,561

ELECTROMECHANICAL BRAKE

George Henry Pickering, Bedford, England, assignor to Cutler Hammer, Inc., Milwaukee, Wis., a corporation of Delaware Application December 9, 1931, Serial No. 579,835
In Great Britain January 20, 1931

5 Claims. (Cl. 188—171)

This invention relates to, and has for its object the provision of improvements in, electro-mechanical brakes.

The invention consists broadly in the arrangement according to which the magnetically generated thrust between the two elements carrying the brake shoes is taken by a loosely mounted ball of steel or other durable material.

The invention further comprises the arrangement, in a brake of the type in which a lever pivotally mounted on one of the brake shoe-carrying elements co-acts with the other brake shoe-carrying element for separating the brake shoes, according to which the pivot point of said lever is approximately vertically above the centre of the brake drum.

In order that the invention may be the more clearly understood an electro-mechanical brake in accordance therewith will now be described, reference being made to the accompanying drawing wherein:—

Figure 1:
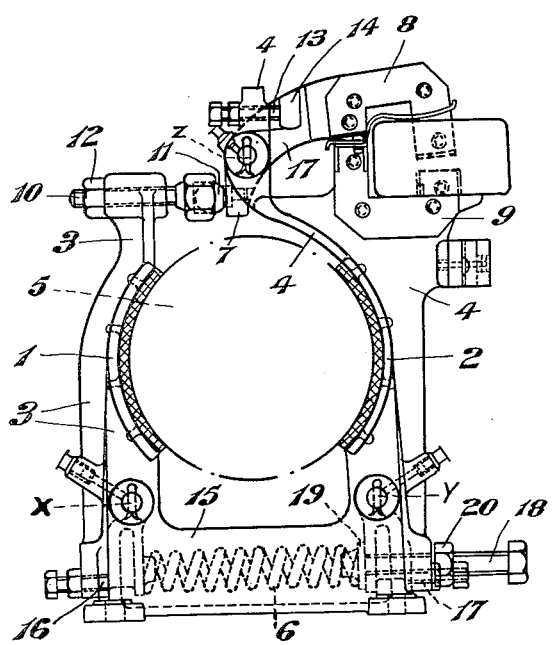
Fig. 1 is a side elevation of said brake.

Referring to the drawing the two brake shoes 1 and 2 form part of respective more or less upright levers 3 and 4 on opposite sides of the brake drum 5, which levers are pivoted near their lower ends about fixed axes X and Y parallel to the axis of the brake drum and below the centre of the brake drum. These levers 3 and 4 have their lower extremities, beyond said fixed pivot axes X and Y, biased apart from one another by means of a strong helical spring 6 in compression between them. Thus the portions of the levers constituting the brake shoes 1 and 2 are biased towards one another or in other words the brake is permanently spring biased to one "on" position.

Figure 2:
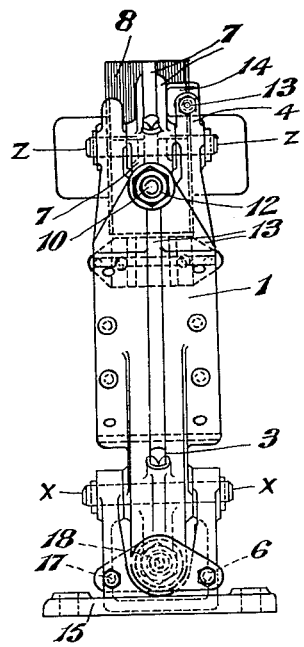
Fig. 2 is an end elevation of the same looking from the left of Fig. 1.

The lever 4 as shown in Fig. 1 curves at its upper end beyond the brake shoe 2, around the brake drum 5 until it reaches a point approximately above the centre of said brake drum whereupon it turns vertically upwards for the remainder of its length. This vertical portion is bifurcated, as best shown in Fig. 2, and about midway of its length is pivoted, about an axis Z parallel to, and substantially vertically above, the drum axis, to a bell crank lever 7, the shorter arm of which extends more or less downwardly from the pivot axis and the longer arm of which extends horizontally to the right according to Fig. 1. This longer arm has laminated portions 8 mounted on the free end thereof and said arm constitutes the armature member of an electromagnet whose field element 9 is mounted underneath said armature member in rigid relation with the lever 4.

The left hand lever 3 extends upwards from the upper end of the brake shoe 1 and terminates in a horizontally screw tapped boss at the same level as the downwardly extending short arm of the bell crank lever 7. A rod 10 is screwed into the tapped hole of this boss and the right hand end of this rod terminates in an enlarged head having in its extremity a substantially cylindrical recess in which a hard steel ball 11 fits easily with rather less than half of it projecting. The wall of the recess is provided with a lip to limit the outward movement of the ball. This ball engages with a specially hard surface on the downwardly projecting short arm of the bell crank lever 7, and the dimensions are such that, when the brake shoe linings are in contact with the brake drum 5, this engagement presses the said arm 7 to the right relative to the lever 4 and therefore lifts the armature element 8 relative to the field element 9 of the electro-magnet. This will be the position when the electro-magnet is deenergized and the spring 6 permitted to prevail. On the other hand when said electro-magnet is energized the armature element 8 will be moved downwards, and the shorter arm of the bell crank lever 7 to the left, relative to the lever 4 and thus by virtue of said engagement between said shorter arm 7 and the steel ball 11 the upper portions of the two main levers 3 and 4 will be forced apart in opposition to the spring 6 and the brake shoes 1 and 2 will be held clear of the drum 5.

Figure 3:
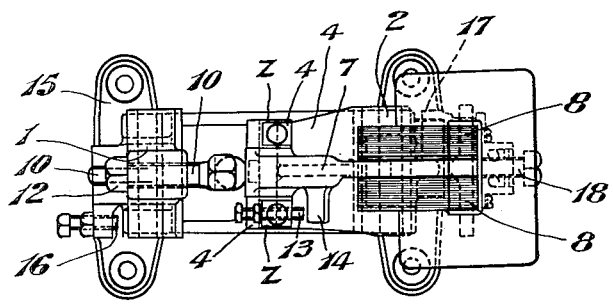
Fig. 3 is a plan of the same.

The end of the screwed rod 10 projecting leftwards from the boss on the lever 3 is provided with a lock nut 12 by which said rod may be locked at an adjusted position relative to said lever 3. The enlarged head on said rod 10 may be formed as a nut as shown for screwing said rod in place, and an adjustable stop 13 carried on one side of the bifurcated portion at the upper end of the lever 4 is adapted to engage a lug 14 on the longer arm of the bell crank lever 7 for limiting the movement apart of the elements 8 and 9 of the electro-magnet and therefore the movement together of the brake shoes 1 and 2. However, under normal conditions the stop 13 clears the lug 14 as shown in Fig. 3 to permit engagement of the shoes 1 and 2 with brake drum 5 but upon excessive wear of the brake linings said stop engages said lug to render said brake shoes ineffective.

By pivoting the bell crank lever 7 about an axis substantially vertically above the centre of the brake drum 5 the pull of the electro-magnet is most efficiently utilized without doing unnecessary work against gravity. In other words, with the bell crank lever 7 arranged in this manner the parts of the electro-magnet are substantially balanced upon the pivot of lever 4 to prevent biasing of said lever by the weight of said parts.

The whole device is supported from a rigid base 15 by which are carried the pivot pins about whose axis X and Y the levers 3 and 4 are pivoted. Adjustable stops 16 and 17 carried at the lower ends of these levers 3 and 4 are adapted to engage with this base for limiting the outward movement of the shoes.

The compression of the spring 6 may be adjusted by means of a screwed bolt 18 screwed through the lower end of the lever 4 and carrying at its inner end the element 19 against which the near end of said spring abuts. The numeral 20 designates a lock nut for this bolt 18.

What I claim and desire to secure by Letters Patent is:—

1. In a brake, the combination with a drum and vertically disposed pivoted brake levers arranged on opposite sides thereof and biased to engage the same, of releasing means for said levers including an electromagnet mounted upon the upper end of one of said levers, said electromagnet having a horizontally arranged armature member pivotally mounted upon said lever, and a cooperating field member fixed to said lever, and an operating connection between said armature member and the other of said levers including abutting parts carried by said armature member and said latter lever.

2. In a brake, the combination with a drum and vertically disposed pivoted brake levers arranged on opposite sides thereof and biased to engage the same, of releasing means for said levers including an electromagnet mounted upon the upper end of one of said levers, said electromagnet having a horizontally arranged armature member pivotally mounted upon said lever and a cooperating field member fixed to said lever, and an operating connection between said armature member and the other of said levers including abutting parts carried by said armature member and said latter lever, one of said parts comprising a loosely mounted ball.

3. In a brake, the combination with a drum, of vertically disposed brake levers arranged on opposite sides thereof and biased to engage the same, said levers being pivoted below said drum on opposite sides of the axis thereof, a releasing magnet mounted upon the upper end of one of said levers, said magnet having its parts arranged to substantially balance upon the pivot of said lever, and including a fixed field member and a horizontally arranged pivoted armature member and an operating connection between said armature member and the other of said levers.

4. In a brake, the combination with a drum, of vertically disposed brake levers arranged on opposite sides thereof, and biased to engage the same, said levers being pivoted below said drum and on opposite sides of the axis thereof, a releasing magnet mounted upon the upper end of one of said levers, said magnet having a field member fixed to said lever and a cooperating horizontally arranged armature member pivotally mounted upon said lever at a point above said drum and substantially vertical with respect to the axis thereof, and an operating connection between said armature member and the other of said levers, including abutting parts carried by said armature member and said latter lever.

5. In a brake, the combination with a drum, of vertically disposed brake levers arranged on opposite sides thereof, said levers being pivoted below said drum on opposite sides of the axis thereof, a spring arranged below said drum and associated with said levers to bias the same for engagement with said drum, a releasing magnet mounted upon the upper end of one of said levers, said magnet having a field member fixed to said lever and a cooperating horizontally arranged armature member pivotally mounted upon said lever at a point above said drum and substantially vertical with respect to the axis thereof, and operating connections between said armature member and the other of said levers including abutting parts carried by said armature member and said latter lever.

GEORGE HENRY PICKERING.